United States Patent [19]

Farrell et al.

[11] 4,268,058
[45] May 19, 1981

[54] COUPLER FOR SNOWPLOW

[75] Inventors: Eugene A. Farrell, Fishers Landing; Jean A. LaBow, Fineview, both of N.Y.

[73] Assignee: Frink Sno-Plows, Clayton, N.Y.

[21] Appl. No.: 65,441

[22] Filed: Aug. 10, 1979

[51] Int. Cl.$^3$ .......................... B60D 1/02; B60D 3/00
[52] U.S. Cl. .................................. 280/481; 37/42 R; 280/510
[58] Field of Search ............... 280/510, 509, 508, 514, 280/432, 457, 481; 37/42 R

[56] References Cited

U.S. PATENT DOCUMENTS 2,556,748  6/1951  Buckley ............................... 280/510
3,020,066  2/1962  Torrey ................................ 280/510

Primary Examiner—John P. Silverstrim
Attorney, Agent, or Firm—Bruns & Jenney

[57] ABSTRACT

A coupler for rapidly joining a snowplow unit to a prime mover. A horizontally extended tongue is affixed to the push frame of the plow unit which is insertable into a receiving slot contained in the coupler. The tongue is provided with a pair of contoured camming surfaces that are arranged to translate a prescribed motion to a pair of jaw elements contained in a locking mechanism carried by the coupler. The jaw elements are biased to move in contact with the camming surfaces to first move to a fully opened position to allow the tongue to pass into the coupler and then into closed or locked position wherein the push frame of the plow unit is securely drawn into seated contact against the front wall of the coupler. A locking bolt is operatively connected to the locking unit and is adapted to automatically swing into a receiving hole formed in the tongue when the jaw elements are moved toward the locked position and to be lifted from the hole when the jaw elements are moved to a predetermined, partially-opened position.

8 Claims, 4 Drawing Figures

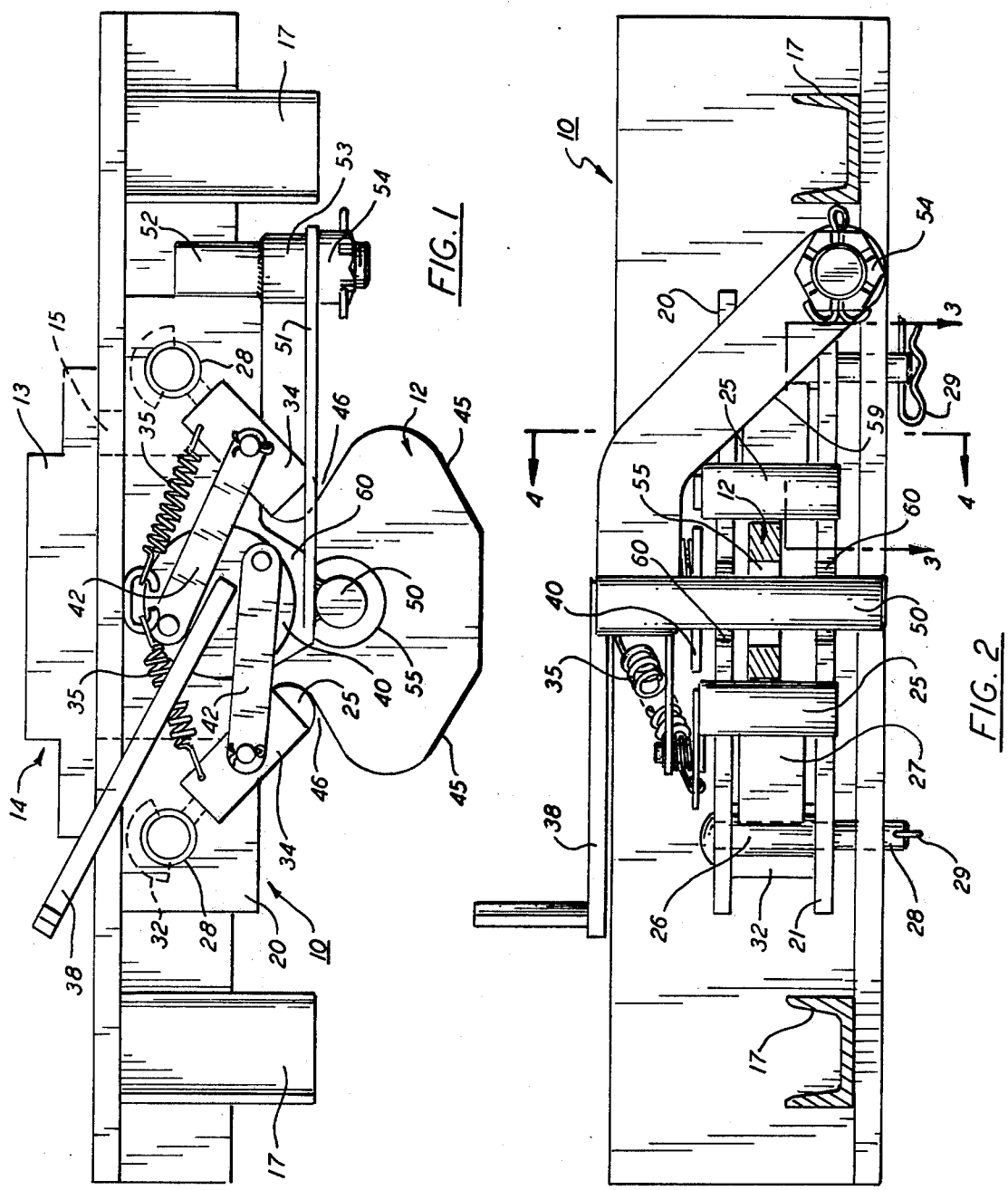

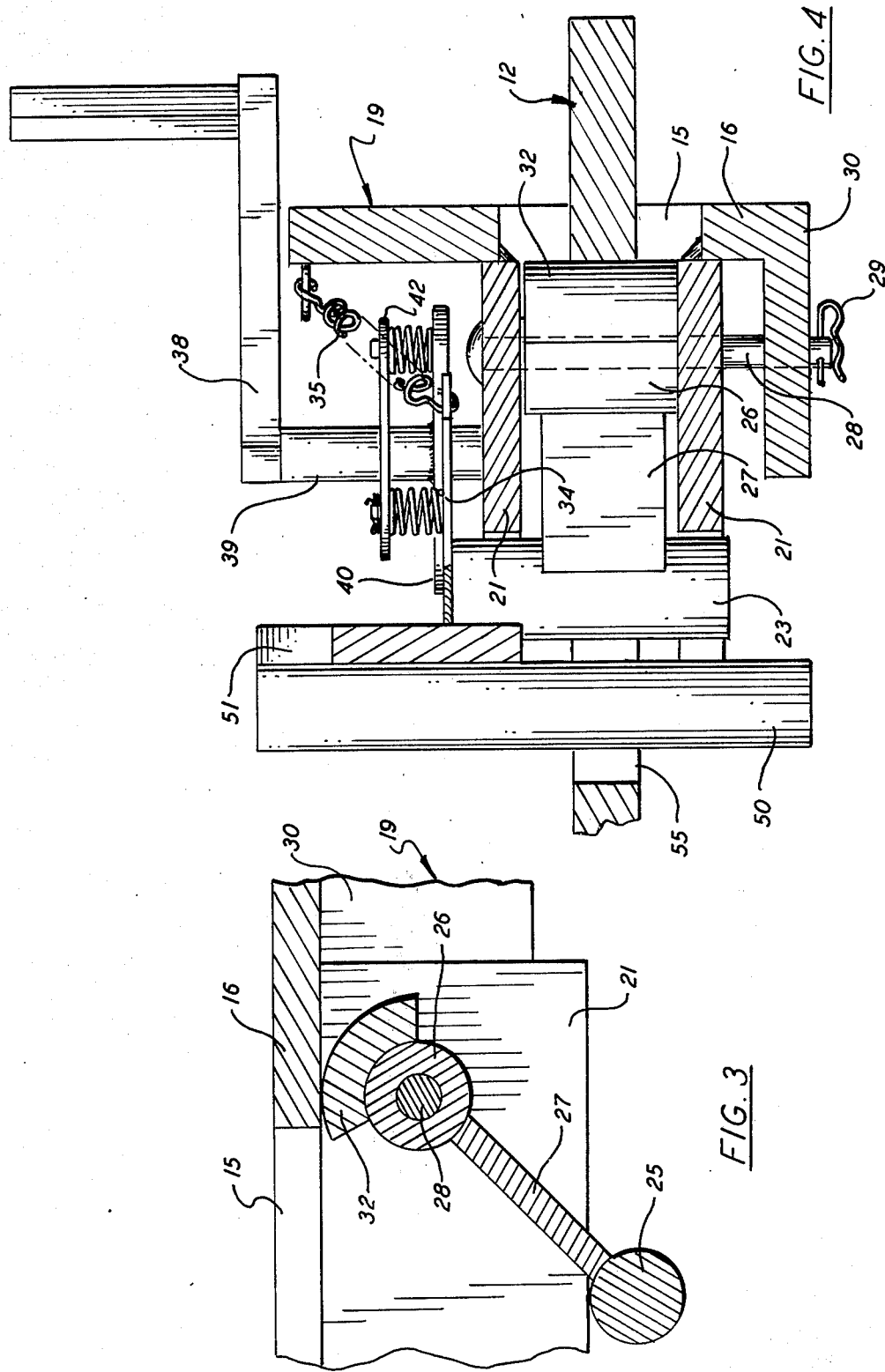

COUPLER FOR SNOWPLOW

BACKGROUND OF THE INVENTION

This invention relates to an improved coupler for detachably connecting a snowplow unit to a prime mover and, in particular, to an automatic device for safety locking the plow unit to the coupler.

As disclosed in U.S. Pat. No. 3,020,066, which issued in January 1959 to Torrey, coupling devices have been used for some time for attaching snowplow blades to a prime mover, such as a truck or the like, for the purpose of permitting rapid coupling and uncoupling of the blade unit. The coupling means is typically secured to the prime mover so that it can be driven against the push frame of the plow thereby causing a pair of spring-biased jaw elements associated with the coupler to automatically lock against a frame-mounted tongue that is forced therebetween. When in a locked condition, the jaw elements are seated within a pair of recessed shoulders formed in the tongue. The shoulders are contoured to draw the push frame snuggly against the front wall of the coupler.

Although most coupling devices of this type have proven to be a highly dependable means for connecting a plow unit to a prime mover, there are nevertheless times when, under severe operating conditions, the plow unit may be able to work itself free from the coupler. As the blade of the plow is driven over rough road surfaces or roads encrusted with ice, snow and sand, the equipment is subjected to serve vibrations and heavy multidirectional stresses. As a consequence, the biased jaw elements can be worked apart and foreign matter thrown up by the plow permitted to foul the coacting components. When this occurs, the jaws can be pushed back to a partially-opened position thereby allowing the plow unit to shift its position in reference to the coupler whereupon damage to the equipment will follow.

SUMMARY OF THE INVENTION

It is therefore an object of the present invention to improve couplers for connecting a snowplow unit to a prime mover.

A further object of the present invention is to protect snowplow equipment from being damaged when it is forced to operate under unfavorable road conditions.

A still further object of the present invention is to securely lock the push frame of a snowplow unit to a vehicle-mounted coupler so that the unit cannot work itself loose when subjected to adverse working conditions.

Another object of the present invention is to provide a coupling mechanism for use in conjunction with a snowplow that is extremely simple to operate and which further provides for the safety of the equipment under a wide range of operating conditions.

These and other objects of the present invention are attained by means of a vehicle mounted coupling device having a slot formed therein for slidably receiving a horizontally extended tongue affixed to the push frame of a snowplow. The tongue contains a pair of contoured camming surfaces that are adapted to act in concert with a pair of jaw elements supported upon the coupler to draw the push frame snuggly against the front wall of the coupler. A locked bolt is operatively connected to the jaw-actuating mechanism so that the bolt will automatically be seated within a receiving hole formed in the tongue when the jaw elements are moved to a locking position against the tonque and to be raised free of the hole when the jaw elements are moved to a predetermined, partially-opened position.

BRIEF DESCRIPTION OF THE DRAWINGS

These and other objects of the present invention shall be explained in further detail with reference to the following detailed description of the invention which is to be read in conjunction with the following drawings, wherein:

FIG. 1 is a top plan view of a coupler embodying the teachings of the present invention;

FIG. 2 is a rear elevation view of the coupler shown in FIG. 1;

FIG. 3 is an enlarged sectional view taken along lines 3—3 in FIG. 2 showing one of the jaw elements utilized in the instant coupler; and FIG. 4 is a slightly enlarged sectional view taken along lines 4—4 in FIG. 2 further showing the component parts of the coupler.

DESCRIPTION OF THE INVENTION

Turning now to the drawings, there is shown a coupler, generally referenced 10, which is similar to that disclosed in the above-noted Torrey patent. As noted by Torrey, in this particular arrangement a horizontally-extended tongue 12 is is affixed to the push frame 13 of a snowplow unit 14 of any suitable construction as is known and used in the art. The tonque is capable of being received within an opening 15 (FIG. 4) formed in the front wall 16 of the coupler assembly. Although not shown, the plow unit is equipped with a blade and one or more adjustable legs which are able to elevate the unit to bring the tongue to the level of the opening.

The coupler is secured to the front end of a prime mover, which in practice is typically a truck, by means of horizontally-extended mounting channels 17—17 or any other suitable means. The coupler includes an angle iron 19, the vertical leg of which forms the front wall 16 of the coupler assembly, and two spaced-apart, horizontally-aligned support brackets 20 and 21 welded to the back surface of the front wall. The horizontal brackets extend rearwardly from the front wall of the coupler assembly and frame the opening 15 contained therein. In operation, the vehicle-mounted coupler assembly is driven up to a properly elevated plow unit and the tonque of the unit is passed into the front opening of the assembly. As will be explained in greater detail below, the tonque, upon entering the coupler, engages a pair of spring-loaded jaw elements 23—23 which function to pull the push frame of the plow unit into abutting contact against the front wall of the coupler and simultaneously therewith lock the unit in an operative position.

As best seen in FIG. 3, each jaw element is comprised of a vertically-aligned cylindrical bearing pin 25 that is secured to a circular hinge section 26 via a connecting member 27. A round-headed pivot 28 is rotatably supported within the hinge section and, in assembly, is passed vertically through the two support brackets 20 and 21 as well as the horizontal leg 30 of the angle iron. The pivot is arranged to hold the hinge section securely seated against an arcuate-shaped pillar 32 that extends vertically between the two support brackets 20, 21. In assembly, the pillar serves as both a guide against which the jaw elements turn and a support pedestal to prevent the jaw elements from being moved back in a horizontal direction when they are placed under operating loads. In assembly, the bearing pin of each jaw element is supported by the bar 28 in an upright position behind the support brackets with each pin being of sufficient vertical length to prevent it from passing between the two brackets. The pivots are secured in position by means of cotter pins 29 to prevent them from being inadvertently displaced from the assembly.

A control plate 34 is welded to the top surface of each bearing pin, passing over the top surface of the upper support bracket 20. An extension spring 35 is connected between the lever arm and the front wall of the coupler which serves to hold the bearing pins of the jaw elements in sliding contact against the side walls of the tongue as shown in FIG. 1.

The jaw elements are adapted to move between a fully opened position and a fully closed position either automatically as the tonque is inserted into the coupler or manually through means of a crank unit. The crank unit basically consists of a crank handle 38 that is rotatably supported in the top support bracket 20 of the coupler midway between the two control plates 34—34. The crank handle contains a vertical shank 39 (FIG. 4) having a disc welded thereto whereby the disc will turn with the handle. A pair of links 42 are pinned at one end to the disc and similarly attached at the other end to a control plate associated with one of the jaw elements. Turning the crank handle in a clockwise direction as shown in FIG. 1 will cause the jaw elements to be moved against the biasing action of the springs to a fully opened position. Release of the handle allows the jaws to be pulled back by the springs into fully closed or locked position.

The tonque 12 of the snowplow unit is provided with two symmetrical camming surfaces 45—45 that are generated in the vertical side walls thereof. The camming surfaces are arranged to slide in contact with the bearing pins of each jaw element to impart a predetermined motion thereto as the tongue moves into the coupler. As best illustrated in FIG. 1, each camming surface is contoured so that it blends uniformly into a recessed shoulder 46 that compliments the geometry of the bearing pin. Initially, as the tongue moves into the coupler, the camming surfaces 45—45 move into contact with the adjacent side walls of the connecting members 27—27. Under the influence of the camming surfaces, the jaw elements are forced back to a fully opened position which occurs as the bearing pin passes over the peaks of the camming lobes. Further movement of the tongue permits the jaw elements to be pulled into the recessed shoulder by the extension springs whereupon the elements assume a locked position as illustrated in FIG. 1. At this time, the bearing pins, acting through the tongue, tend to draw the back surface of the push frame against the front wall of the coupler to provide a relatively stable interface between the cojoined units.

The biased locking jaw mechanism herein described will provide a safe connection under most operating conditions. However, at times, the jaw can be inadvertently moved to a partially-opened position whereupon the snowplow unit can pull away from the coupler. When this happens, the equipment may become damaged. To prevent this from occurring, a locking bolt 50 is mounted upon the coupler that automatically engages the tongue when the snowplow unit is connected thereto. As will be explained in greater detail below, the bolt will remain in locking engagement with the tongue in the event the jaw elements are forced back into a partially-opened position which ordinarily would produce separation of the plow unit from the coupler.

The bolt is secured as by welding to one end of dog-legged actuating arm 51. The other end of the arm is rotatably supported upon a threaded shaft 52 that is welded to the horizontal leg 30 of the angle iron. A spacer 53, which is welded to the shaft, positions the arm at a desired location whereby the arm can swing in a predetermined vertical plane. The arm is secured against the spacer by means of a nut 54 threaded onto the free end of the shaft. In practice, the arm functions to direct the bolt into and out of an oversized receiving hole 55 formed in the tongue.

A follower surface 59 is situated along the bottom surface of the inclined longer section of the actuating arm. In assembly, the follower surface rides in sliding contact against the control bar 34 of one of the jaw elements. The follower surface is adapted to position the bolt in a vertical position as shown in FIG. 2 when the jaw elements are brought to the previously-noted, locked position. Bringing the jaws to the other extreme, or fully opened position, will cause the arm to swing the bolt out of the receiving hole. As the tongue enters the coupler, the jaws are forced back and the bolt raised over the top surface of the tongue. Upon the bearing pins passing over the peaks of the camming holes, the bolt 50 is guided down onto the top surface of the tongue just forward of the receiving hole 55 whereupon further movement of the tongue into the coupler causes the bolt to drop into the hole. The arm, acting under the control of the following surface, will maintain the bolt in the receiving hole as the jaw moves between the fully locked position and a predetermined, partially-opened position at which the tongue would ordinarily be permitted to pull out of the coupler. As a result of this construction, the bolt is able to hold the cojoined components together in the event the jaws are forced out of a locked position under adverse operating conditions.

The upper and lower support brackets, 20 and 21 respectively, are furnished with horizontally-extended reenforcing pads 60—60 that are positioned adjacent to the body of the locking bolt when the bolt is contained within the receiving hole. If the jaw elements are partially opened, thus allowing the tongue to move back in reference to the coupler, the bolt will become wedged within the receiving hole. The actuating arm will deflect under the load sufficiently to allow the bolt to seat against the two pads thereby applying a greater holding force against the tongue. The horizontal spacing between the pads provides for a two point bearing surface which prevents the bolt from turning when placed under relatively heavy loads.

As can be seen, the locking bolt of the present invention will act to safely and securely hold the connectable snowplow unit to the coupler while at the same time permitting the prime mover to automatically connect to the plow unit without the operator leaving the cab.

While this invention has been described with reference to the details as set forth above, it is not limited to the specific structure as disclosed and the invention is intended to cover any modifications or changes as may come within the scope of the following claims.

We claim:

1. In a coupler for attaching a push frame of a snowplow unit to a prime mover wherein an extended tongue is affixed to the push frame and inserted into the coupler, said tongue having a pair of camming surfaces that are adapted to engage a pair of spring-biased jaw elements mounted upon the coupler to automatically move the jaw elements to an open position as the tongue enters the coupler and then permit the jaws to move into a locked position within recessed shoulders formed in the camming surfaces whereby the push frame is drawn securely against the coupler, the improvement comprising an actuating bar pivotably mounted at one end in the coupler to allow the bar to swing in a vertical plane, an elongated bolt affixed to the opposite end of the bar that is arranged to move into a receiving hole formed in the tongue, a follower surface on said bar that rides in contact with one of the jaw elements to guide the bolt into the receiving hole as the jaw elements are moved into a locked position.

2. The improvement of claim 1 wherein the bolt is supported in a vertical position when the jaw elements are brought to a fully locked position.

3. The improvement of claim 2 that further includes stop means secured to the coupler adjacent to the bolt for engaging the bolt to prevent it from moving horizontally in the event the tongue attempts to pull out of the coupler while the bolt is situated within the receiving hole.

4. The improvement of claim 3 wherein said stop means further includes a pair of spaced-apart, horizontally-aligned plates that are arranged to prevent the bolt from turning out of a vertical plane when brought in contact therewith.

5. The improvement of claim 1 wherein the profile of the follower surface is contoured to hold the bolt within the receiving hole when the tongue moves back sufficiently to force the jaw elements into a partially-opened position.

6. Apparatus for securing a push frame of a snowplow blade to a prime mover including a coupler that has a receiving slot formed therein that is secured to a prime mover, a push frame having an extended tongue affixed thereto which is receivable within the slot formed in the coupler, said tongue having a pair of symmetrical camming surfaces formed in the opposed sidewalls thereof and a hole that passes through the top and bottom surfaces thereof, a pair of spring biased jaw members pivotably secured within the coupler on either side of said slot that are arranged to move in sliding contact with the camming surfaces on the tongue so as to move between an open position and a fully locked position wherein the tongue is secured by the jaws within the coupler, and a bolt pivotably supported by an actuating arm within the coupler that is operatively coupled to one of the jaw members to guide the bolt into the hole in the tongue as the jaws move from the open toward the locked position.

7. The apparatus of claim 6 wherein said actuating arm further includes a follower surface that rides in contact with said one jaw member, said follower surface having a profile for controlling the motion of the bolt to retain the bolt in the hole in the event the tongue forces the jaws back from the fully locked position towards a partially opened position.

8. The apparatus of claim 7 that further includes a stop means secured in the coupler for engaging the bolt when it is positioned within the hole to prevent the bolt from twisting in the event the tongue is caused to move out of the locked position.

* * * * *